(12) United States Patent
Ra et al.

(10) Patent No.: US 11,587,206 B2
(45) Date of Patent: *Feb. 21, 2023

(54) AUTOMATED OBSCURITY FOR DIGITAL IMAGING

(71) Applicants: HYUNDAI MOTOR COMPANY, Seoul (KR); KIA CORPORATION, Seoul (KR)

(72) Inventors: Moo-Ryong Ra, Bridgewater, NJ (US); Seungjoon Lee, Basking Ridge, NJ (US); Emiliano Miluzzo, Madison, NJ (US); Eric Zavesky, Austin, TX (US)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 107 days.

This patent is subject to a terminal disclaimer.

(21) Appl. No.: 16/817,673

(22) Filed: Mar. 13, 2020

(65) Prior Publication Data
US 2020/0211162 A1 Jul. 2, 2020

Related U.S. Application Data

(63) Continuation of application No. 15/587,440, filed on May 5, 2017, now Pat. No. 10,628,922, which is a (Continued)

(51) Int. Cl.
*G06K 9/00* (2022.01)
*G06T 5/00* (2006.01)
(Continued)

(52) U.S. Cl.
CPC .......... *G06T 5/002* (2013.01); *G06F 16/51* (2019.01); *G06K 9/6201* (2013.01);
(Continued)

(58) Field of Classification Search
CPC .. G06T 5/002; G06T 7/73; G06T 7/20; G06T 11/60; G06T 2207/30201;
(Continued)

(56) References Cited

U.S. PATENT DOCUMENTS 6,067,399 A * 5/2000 Berger .................. H04N 5/772
386/280
6,801,642 B2 * 10/2004 Gorday ............. H04N 1/00838
382/165
(Continued)

FOREIGN PATENT DOCUMENTS

AU 2002312975 8/2005
EP 2981063 A2 * 2/2016 ........... G06F 16/583
(Continued)

OTHER PUBLICATIONS

Privacy Visor: Method for—Sensitivity, SpringerLink, 2013, pp. 152-161 (Year: 2013).*
(Continued)

*Primary Examiner* — Jayesh A Patel
(74) *Attorney, Agent, or Firm* — Morgan, Lewis & Bockius LLP

(57) ABSTRACT

Obfuscating a human or other subject in digital media preserves privacy. A user of a smartphone, for example, may enable a flag for obscuring her face in digital photos or movies. When any device captures digital media, the user's smartphone transmits the flag for receipt. The device capturing the digital media is thus informed of the user's desire to obscure her face or even entire image. The device capturing the digital media may thus perform an obscuration in response to the flag.

20 Claims, 6 Drawing Sheets

Related U.S. Application Data continuation of application No. 14/334,157, filed on Jul. 17, 2014, now Pat. No. 9,679,194.

(51) Int. Cl.

| | | |
|---|---|---|
| *G06K 9/62* | (2022.01) | |
| *G06T 7/20* | (2017.01) | |
| *G06T 11/60* | (2006.01) | |
| *G06F 16/51* | (2019.01) | |
| *G06T 7/73* | (2017.01) | |
| *G06V 10/40* | (2022.01) | |
| *G06V 10/42* | (2022.01) | |
| *G06V 40/16* | (2022.01) | |

(52) U.S. Cl.
CPC ......... *G06K 9/6215* (2013.01); *G06K 9/6247* (2013.01); *G06T 7/20* (2013.01); *G06T 7/73* (2017.01); *G06T 11/60* (2013.01); *G06V 10/40* (2022.01); *G06V 10/42* (2022.01); *G06V 40/166* (2022.01); *G06V 40/168* (2022.01); *G06V 40/169* (2022.01); *G06V 40/172* (2022.01); *G06T 2207/30201* (2013.01); *G06T 2207/30241* (2013.01)

(58) Field of Classification Search
CPC ...... G06T 2207/30241; G06F 17/3028; G06K 9/00255; G06K 9/00268; G06K 9/00275; G06K 9/00288; G06K 9/46; G06K 9/52; G06K 9/6201; G06K 9/6215; G06K 9/6247

See application file for complete search history.

(56) References Cited

U.S. PATENT DOCUMENTS

| | | | |
|---|---|---|---|
| 6,853,750 B2* | 2/2005 | Aoki | G06V 10/40 |
| | | | 382/233 |
| 6,959,099 B2* | 10/2005 | Gutta | G06V 40/161 |
| | | | 382/282 |
| 7,092,568 B2 | 8/2006 | Eaton | |
| 7,440,594 B2* | 10/2008 | Takenaka | G08B 13/1961 |
| | | | 382/118 |
| 7,564,476 B1 | 7/2009 | Coughlan et al. | |
| 7,570,283 B2* | 8/2009 | Sato | H04N 1/00281 |
| | | | 348/333.12 |
| 7,587,083 B2* | 9/2009 | Tabata | G06T 5/40 |
| | | | 382/162 |
| 7,920,169 B2* | 4/2011 | Jung | H04N 5/232941 |
| | | | 348/211.1 |
| 7,991,388 B1 | 8/2011 | Becker | |
| 8,126,190 B2 | 2/2012 | Jung | |
| 8,139,818 B2 | 3/2012 | Takahata | |
| 8,159,519 B2 | 4/2012 | Kurtz et al. | |
| 8,203,609 B2* | 6/2012 | Jung | H04N 1/00864 |
| | | | 348/148 |
| 8,212,872 B2* | 7/2012 | Sablak | H04N 7/18 |
| | | | 348/143 |
| 8,509,499 B2* | 8/2013 | Ioffe | G06T 11/60 |
| | | | 382/118 |
| 8,571,354 B2* | 10/2013 | Miksa | G06T 5/20 |
| | | | 382/105 |
| 8,610,787 B2* | 12/2013 | Namba | H04N 5/23219 |
| | | | 348/222.1 |
| 8,630,956 B2* | 1/2014 | Arisawa | H04L 67/10 |
| | | | 705/319 |
| 8,744,143 B2 | 6/2014 | Chen | |
| 8,914,897 B2* | 12/2014 | Fowler | H04N 21/4524 |
| | | | 726/28 |
| 9,124,762 B2* | 9/2015 | Cutler | G06T 7/11 |
| 9,232,176 B2* | 1/2016 | Porten | H04N 21/2347 |
| 9,298,931 B2* | 3/2016 | Ur | G06F 21/6245 |
| 9,419,820 B1* | 8/2016 | Liang | G06Q 50/01 |
| 9,491,263 B2 | 11/2016 | Gadot | |
| 9,547,760 B2 | 1/2017 | Kang | |
| 9,679,194 B2* | 6/2017 | Ra | G06V 40/169 |
| 9,769,367 B2* | 9/2017 | Rifkin | G06F 3/017 |
| 10,102,543 B2 | 10/2018 | Holman | |
| 10,223,578 B2 | 3/2019 | Shah | |
| 10,628,922 B2* | 4/2020 | Ra | G06K 9/6247 |
| 2001/0041007 A1 | 11/2001 | Aoki | G06V 10/40 |
| | | | 382/190 |
| 2003/0202686 A1* | 10/2003 | Rowe | G06T 17/20 |
| | | | 382/118 |
| 2003/0206654 A1* | 11/2003 | Teng | G06T 11/60 |
| | | | 382/284 |
| 2004/0010553 A1 | 1/2004 | Katz | |
| 2004/0140971 A1 | 7/2004 | Yamazaki | |
| 2004/0202382 A1* | 10/2004 | Pilu | H04N 1/00342 |
| | | | 386/E5.072 |
| 2005/0007456 A1* | 1/2005 | Lee | H04N 1/00973 |
| | | | 348/207.99 |
| 2005/0008226 A1* | 1/2005 | Aoki | G06V 10/40 |
| | | | 382/190 |
| 2005/0105779 A1 | 5/2005 | Kamei | |
| 2005/0149334 A1* | 7/2005 | Chen | G10L 15/26 |
| | | | 704/E15.045 |
| 2005/0244033 A1* | 11/2005 | Ekin | H04N 7/181 |
| | | | 382/103 |
| 2005/0275723 A1* | 12/2005 | Sablak | G06T 7/215 |
| | | | 348/169 |
| 2006/0140475 A1 | 6/2006 | Chin | |
| 2006/0222213 A1 | 10/2006 | Kiyohara | |
| 2007/0071290 A1 | 3/2007 | Shah | |
| 2007/0153091 A1 | 7/2007 | Watlington et al. | |
| 2007/0188795 A1* | 8/2007 | Chishima | G06V 40/161 |
| | | | 358/1.15 |
| 2009/0015670 A1* | 1/2009 | Gopinath | G08B 13/19686 |
| | | | 348/143 |
| 2009/0016617 A1 | 1/2009 | Bregman-Amitai | |
| 2009/0041311 A1 | 2/2009 | Hundley | |
| 2009/0128632 A1 | 5/2009 | Goto | |
| 2009/0262987 A1* | 10/2009 | Ioffe | G06T 5/005 |
| | | | 382/103 |
| 2010/0053370 A1* | 3/2010 | Crisan | H04N 1/00204 |
| | | | 348/231.2 |
| 2010/0149330 A1 | 6/2010 | Salgar | |
| 2010/0205667 A1 | 8/2010 | Anderson et al. | |
| 2010/0246890 A1 | 8/2010 | Ofek et al. | |
| 2010/0220208 A1* | 9/2010 | Park | H04N 5/23219 |
| | | | 348/222.1 |
| 2010/0231753 A1* | 9/2010 | Hagiwara | H04N 5/23229 |
| | | | 348/E5.031 |
| 2010/0235400 A1 | 9/2010 | Myers | |
| 2011/0134311 A1* | 6/2011 | Nagao | H04N 5/23216 |
| | | | 348/E5.045 |
| 2011/0161217 A1 | 6/2011 | Cohen | |
| 2011/0202968 A1* | 8/2011 | Nurmi | G06F 21/10 |
| | | | 726/1 |
| 2011/0238676 A1* | 9/2011 | Liu | H04M 1/72439 |
| | | | 715/764 |
| 2011/0242361 A1* | 10/2011 | Kuwahara | G06F 1/1656 |
| | | | 348/231.4 |
| 2012/0250951 A1* | 10/2012 | Chen | G06Q 50/01 |
| | | | 382/118 |
| 2012/0262987 A1 | 10/2012 | Kuo | |
| 2012/0327176 A1 | 12/2012 | Kee | |
| 2013/0078962 A1* | 3/2013 | Clarke | H04M 1/72436 |
| | | | 455/414.1 |
| 2013/0088562 A1 | 4/2013 | Hong et al. | |
| 2013/0156331 A1* | 6/2013 | Kurabayashi | G06V 40/161 |
| | | | 382/224 |
| 2013/0163829 A1 | 6/2013 | Kim | |
| 2013/0235233 A1* | 9/2013 | Ellis | H04N 5/23293 |
| | | | 348/222.1 |
| 2013/0322706 A1 | 12/2013 | Hudgins | |
| 2014/0074923 A1 | 3/2014 | Vasudevan | |
| 2014/0086493 A1* | 3/2014 | Kothari | G06V 40/16 |
| | | | 382/195 |

(56) References Cited

U.S. PATENT DOCUMENTS

| | | | |
|---|---|---|---|
| 2014/0152815 A1* | 6/2014 | Huang | H04N 5/23238 348/143 |
| 2014/0325601 A1* | 10/2014 | Sun | H04L 63/101 726/4 |
| 2014/0347397 A1 | 11/2014 | Wu | |
| 2014/0362163 A1* | 12/2014 | Winterstein | H04N 7/141 348/14.07 |
| 2014/0376772 A1* | 12/2014 | Lin | G06V 20/593 382/103 |
| 2015/0094118 A1 | 4/2015 | Rodolico | |
| 2015/0104103 A1* | 4/2015 | Candelore | G06V 20/52 382/195 |
| 2015/0229882 A1* | 8/2015 | Liu | H04N 7/15 348/14.08 |
| 2015/0306330 A1 | 10/2015 | Richard | |
| 2015/0332439 A1* | 11/2015 | Zhang | G06V 20/52 345/647 |
| 2015/0341561 A1* | 11/2015 | Petrescu | H04N 1/00 348/333.02 |
| 2016/0358013 A1 | 12/2016 | Carter | |
| 2017/0126630 A1* | 5/2017 | Ekambaram | H04L 63/102 |

FOREIGN PATENT DOCUMENTS

| | | | |
|---|---|---|---|
| GB | 2400514 | 10/2004 | |
| GB | 2400514 A * | 10/2004 | H04N 1/00167 |
| JP | 2001-235812 | 8/2001 | |
| JP | 2001235812 A * | 8/2001 | |
| JP | 2006-155109 | 6/2005 | |
| JP | 2006155109 A * | 6/2006 | |
| JP | 2006-217161 | 8/2006 | |
| JP | 2006217161 A * | 8/2006 | |
| JP | 2008118289 | 5/2008 | |
| JP | 2008-160354 | 7/2008 | |
| JP | 2008160354 A * | 7/2008 | H04N 5/232 |
| JP | 2008-197837 | 8/2008 | |
| JP | 2008197837 A * | 8/2008 | G06K 9/00228 |
| WO | WO-2010036098 A1 * | 4/2010 | G06T 5/002 |
| WO | WO-2012019840 A1 * | 2/2012 | G01D 3/08 |
| WO | WO-2013098587 A1 * | 7/2013 | G06F 21/6245 |
| WO | WO-2014028009 A1 * | 2/2014 | G06F 21/00 |

OTHER PUBLICATIONS

Blinkering Surveillance: Enabling Video—Vision Andrew senior et al., RC22886 (W0308-109), Aug. 28, 2003, pp. 1-15 (Year: 2003).*

Moving Beyond Untagging: Photo Privacy in a Tagged World, Andrew Besmer et al., CHI 2010, Apr. 10-15, 2010, pp. 1563-1572 (Year: 2010).*

Offlinetags—A Novel Privacy Approach to Online Photo Sharing, Frank Palias et al., CHI, 2014, pp. 2179-2184 (Year: 2014).*

Framework based on Privacy Policy Hiding for Preventing Unauthorized Face Image Processing, Adrian Dabrowski et al., 978-1-IEEE, 4799-0652-9, 2013, pp. 455-461 (Year: 2013).*

Negotiating Privacy Preferences in Video Surveillance Systems, Mukhtaj S. Barhm et al., Springer, 2011, pp. 511-521 (Year: 2011).*

Tag Detection for Preventing Unauthorized Face Image Processing, Alberto Escalada Jimenez et al., Springer, 2015, pp. 513-524 (Year: 2015).*

Neustaedter et al., "Blur filtration fails to preserve privacy for home-based video conferencing." ACM Transactions on Computer-Human Interaction (TaCHI) Jan. 13, 2006. pp. 1-36.

Senior et al., "Blinking surveillance: Enabling video privacy through computer vision." IBM Technical Paper, RC22886 (W0308-109), Aug. 28, 2003, pp. 1-14.

Neustaedter et al., "Balancing privacy and awareness of telecommuters using blur filtration." Report 2003, 719-22, Department of Computer Science, University of Calgary, 2003, 20 pgs.

Lipton, "We, the Paparazzi': Developing a Privacy Paradigm for Digital Video." 2009, pp. 919-984.

Akarun et al., "3D face recognition for biometric applications." 13 European Signal Processing Conference (EUSIPCO), 2005, 5 pgs.

Yamada et al., "Privacy Visor: Method for Preventing Face Image Detection by Using Differences in Human Device Sensitivity." Communication and Multimedia Security, Spring Berlin Heidelberg, 2013, Abstract.

Besmer et al., "Moving beyond untagging: photo privacy in a tagged world." Proceedings of the SIGCHI Conference on Human Factors in Computing Systems, ACM Apr. 10-15, 2010. pp. 1563-1572.

Cutillo, Leucio Antonio, et al., "Privacy preserving picture sharing—social networkds", ACM 978-1-4503-1164-9, 2012, pp. 1-6.

* cited by examiner

US 11,587,206 B2

AUTOMATED OBSCURITY FOR DIGITAL IMAGING

CROSS-REFERENCE TO RELATED APPLICATIONS

This application is a continuation of U.S. application Ser. No. 15/587,440 filed May 5, 2017 and since issued as U.S. Pat. No. 10/628,922, which is a continuation of U.S. application Ser. No. 14/334,157 filed Jul. 17, 2014 and since issued as U.S. Pat. No. 9,679,194, with both applications incorporated herein by reference in their entireties.

The present disclosure relates generally to communication networks and, more particularly, to systems and methods for obfuscating unwilling subjects in captured media.

BACKGROUND

Mobile devices, e.g., Smartphones and tablets, have excellent point-and-shoot cameras, allowing users to take numerous pictures and videos any time and everywhere. Furthermore, wearable devices such as smart goggles can record media in even more subtle ways in public and private places, with little or no awareness from the subjects in the surrounding areas captured by the smart goggles. The pervasive use of these mobile devices can compromise the privacy of all the individuals who are unaware subjects of these captured pictures and videos, which could also be published without explicit consent on the Internet and on social media sites.

SUMMARY

In one embodiment, the present disclosure discloses a method for obfuscating an image of a subject in a captured media. For example, the method receives a communication from an endpoint device of a subject indicating that the image of the subject is to be obfuscated in a captured media. The communication may include a feature set associated with the subject, where the feature set contains facial features of the subject and motion information associated with the subject. The method then detects the image of the subject in the captured media. For example, the image of the subject is detected by matching the facial features of the subject to the image of the subject in the captured media and matching the motion information associated with the subject to a trajectory of the image of the subject in the captured media. The method then obfuscates the image of the subject in the captured media when the image of the subject is detected in the captured media.

In another embodiment, the present disclosure discloses an additional method for communicating a feature set. For example, the method records motion information of an endpoint device associated with a subject and transmits a communication indicating that the image of the subject is to be obfuscated in the captured media. In one embodiment, the communication includes a feature set associated with the subject, where the feature set includes facial features of the subject and the motion information of the endpoint device.

In still another embodiment, the present disclosure discloses a further method for obfuscating an image of a subject in a captured media. For example, the method receives a captured media from a recording endpoint device and receives a communication from an endpoint device of a subject indicating that the image of the subject should be obfuscated in a captured media. The communication may include a feature set associated with the subject, where the feature set contains facial features of the subject and motion information associated with the subject. The method then detects the image of the subject in the captured media. For example, the image of the subject is detected by matching the facial features of the subject to the image of the subject in the captured media and matching the motion information associated with the subject to a trajectory of the image of the subject in the captured media. The method then obfuscates the image of the subject in the captured media when the image of the subject is detected in the captured media.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
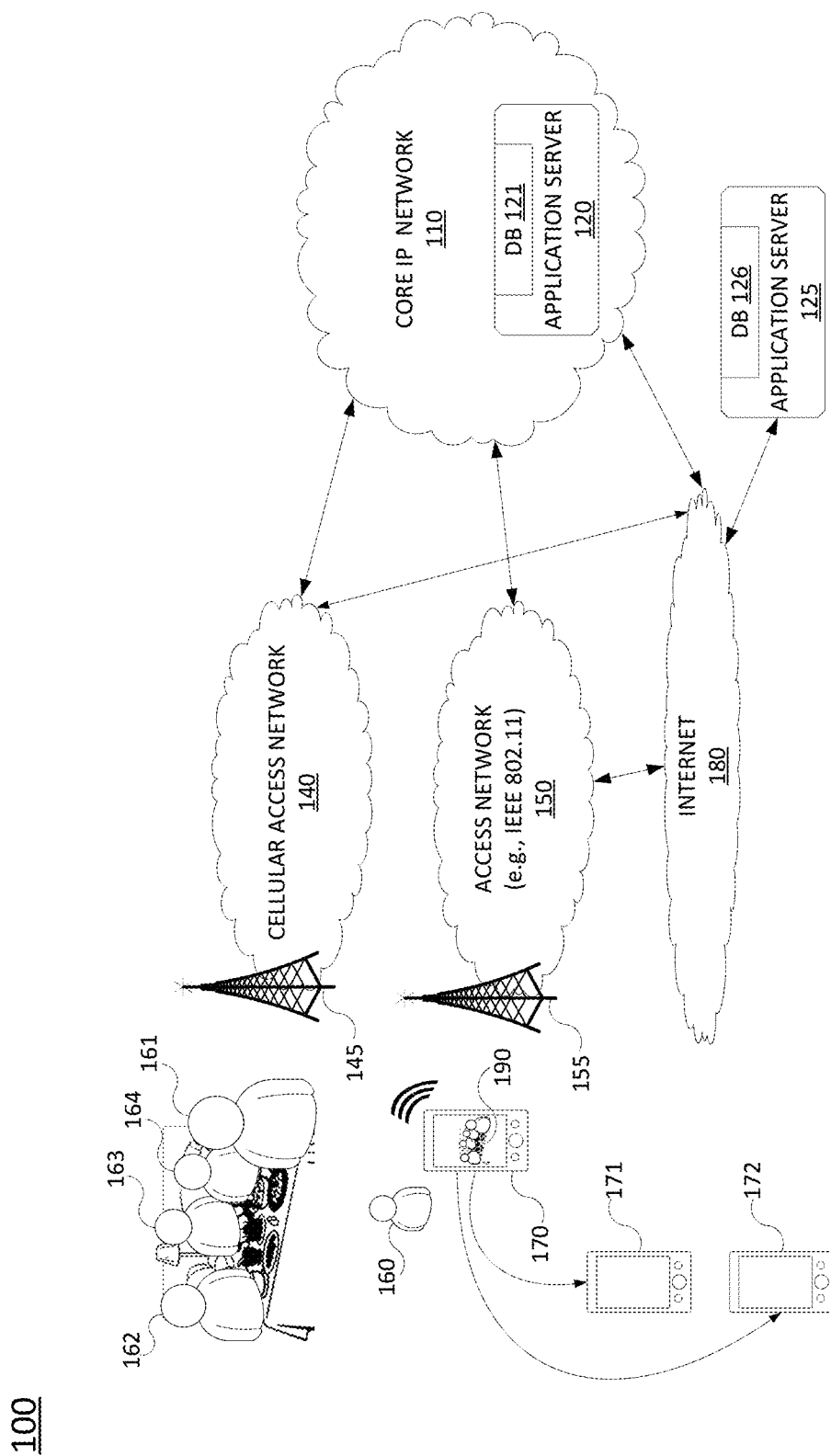
FIG. 1 illustrates an exemplary network related to the present disclosure.

The present disclosure broadly discloses methods, computer-readable media and devices for obfuscating images of subjects in captured media. Examples of the present disclosure are discussed below in the context of endpoint device-based and/or peer-to-peer based arrangements, e.g., using any one or more short range communication technologies, such as Wi-Fi Direct. Additional examples are also described in the context of wireless access networks and Internet Protocol (IP) networks. However, it should be noted that specific examples are provided for illustrative purposes only and that the present disclosure may alternatively or additionally be applied to packet switched or circuit switched networks in general, e.g., Voice over Internet Protocol (VoIP) networks, Service over Internet Protocol (SoIP) networks, Asynchronous Transfer Mode (ATM) networks, Frame Relay networks, various types of cellular networks, and the like.

Privacy leakage through published digital media is difficult, if not impossible, to completely control for all appearances in third-party, and sometimes public, photos and videos without having expressed explicit consent. An individual and his or her children in a crowded place, e.g., Times Square of New York City, may become unaware subjects of hundreds of pictures taken from surrounding strangers. Similarly, a picture captured at a party or a restaurant may be posted on a social network site with no knowledge of the involved subjects. Whether a personal preference or the potential for picture misuse, individuals may wish to restrict their appearance in uncontrolled media.

As described herein, embodiments of the present disclosure are sometimes referred to as Do Not Capture (DNC), a technology that removes unwilling subjects from captured media. Through a combination of mutual cooperation between mobile devices and image matching algorithms (face detection and face matching algorithms in particular), DNC effectively obfuscates unwilling subjects in captured media with high accuracy. As used herein, the term "obfuscate" is intended to mean the altering of media such that a subject of the media is not personally identifiable. For example, obfuscation may include blurring an image of a subject such that a face or other aspects of a subject cannot be attributed to the subject. For instance, blurring may comprise altering pixel values of an image of the subject by averaging the values of groups of nearby pixels so as to pixelate the image. In another example, obfuscation may comprise blocking out all or a portion of an image of a subject, e.g., setting pixels to black or to another color, replacing all or a portion of an image of a subject with an image of a different subject, or with another image, e.g., a non-human image, such as a logo. In still another example, obfuscation may comprise removing the image of the subject from a foreground of the captured media and reconstructing the background.

In one example, DNC may be implemented in a completely distributed manner, with no need of cloud support, and is designed to efficiently run on a mobile device in a scalable manner with little impact on mobile device's performance. The DNC pipeline can be partitioned as follows: i) when a person (a "taker") takes a picture, his or her device collects face feature vectors from nearby subjects' devices; ii) the taker's device then uses one or more face detection techniques to identify human subjects in the image; iii) the taker's device next performs a face matching algorithm using the collected face feature vectors to identify possible DNC subjects in the image (in one embodiment, the face matching algorithm is enhanced using motion/orientation information obtained by devices of the subjects); and iv) finally, the taker's device obfuscates or blurs any face belonging to detected DNC subjects.

To illustrate, if a person (DNC subject) does not want to be included in pictures taken by strangers, the subject may enable a DNC flag on his or her mobile device which causes the mobile device to wirelessly transmit a DNC signal. The DNC signal indicates the subject's desire that his or her image be obfuscated in any photographs or other captured media. Accordingly, in one example a device of a person taking a photo or video ("taker") performs a periodic scan over a short-range wireless interface, e.g., Wi-Fi Direct, Bluetooth of Bluetooth SIG, and so forth, to detect DNC subjects in the area. If a DNC flag being transmitted by a subject's device is detected, the taker's device obtains from the subject's device a feature vector comprising (1) information regarding the subject's face, and/or (2) motion/orientation information collected by the subject's device. In one example, the taker's device then performs face and motion/orientation matching with any subjects present in the picture. In one example, a face is obfuscated (e.g., blurred, rendered unclear, and the like) upon matching a DNC subject's feature vector. By blurring faces at capture time, a subjects' identity is obfuscated before the media is saved on the taker's device or pushed to the Web. Alternatively or in addition, image in-painting, seam carving, pixel inference and other techniques may be used to obscure an image of a subject's face (or a larger portion of a subject's body).

Notably, many object recognition algorithms (including facial recognition algorithms) perform optimally under uniform lighting and static conditions, which is not necessarily the case in a DNC setup. In addition, most of these techniques are designed to operate on powerful desktop machines and not on more resource-constrained mobile devices. Thus, the present disclosure enhances facial recognition techniques with motion and/or orientation information to improve recognition performance.

In one embodiment, it is assumed that each individual will enable and disable DNC on his or her own device based upon a personal awareness of the surroundings and context, e.g., enabling the DNC feature or notification in public places, disabling the DNC feature or notification at home or when there are known people around. In one embodiment, it is also assumed that the underlying software and hardware of a mobile or wearable device is trusted and will not be modified in a malicious way, e.g., with DNC being either rooted inside the device's operating system or implemented as an application that can be downloaded or otherwise obtained from a trusted source.

In one example, the present disclosure comprises a system that utilizes a DNC feature vector, which may be constructed from quantized vectors of a subject's face, and motion/orientation sensor data. In one example, the quantized vectors may comprise eigenvectors of a subject's face (also referred to as an eigenface). In one example, a subjects' eigenface is extracted during a one-time offline training phase. Accordingly, an eigenvector/eigenface-based algorithm is then used to determine facial similarity. Utilizing this algorithm, a single feature space (basis) is constructed from a large set of training face data obtained off-line. Thus, in accordance with the present disclosure, when a photograph or video is taken, all detected faces in the media are projected into the known basis to generate smaller dimensional features. The system then calculates the Euclidean distance between each of the projected faces and the eigenface of the subject to determine the best match.

It should be noted that although various embodiments are described in connection with an eigenface algorithm, the present disclosure is not limited to the use of this technique. For example, the set of quantized vectors may be encoded using techniques such as principal component analysis (PCA), partial least squares (PLS), sparse coding, vector quantization (VQ), deep neural network encoding, and so forth. However, while other recognition algorithms may be optimized for various scenarios, eigenface is a suitable baseline algorithm due to transmission requirements for small dimensional feature vectors, fast basis projections with linear algebra, and support for simple distance metrics. In addition, for simplicity, examples are primarily described herein in connection with capturing of a photograph. However, it should be noted that the present disclosure is broadly applicable to photographs and video, as well as other audio-visual media in which an image of a person may be captured and for which associated motion data is available.

In one example, the motion/orientation sensor data (broadly and collectively a "motion signature" or "motion fingerprint") is obtained in-real time from motion sensors within or associated with a subject's device. For example, one embodiment may include an accelerometer, gyroscope, and/or magnetometer. In one example, the sensor readings provide a motion signature comprising time-series data for a rotation vector and linear acceleration (e.g., in three dimensions). In one embodiment, an orientation of the subject's device may also be determined from the accelerometer, gyroscope, and/or magnetometer readings. Thus, for purposes of the present disclosure "motion information", or a "motion signature" may also be considered to include orientation information regarding a subject's device. In any case, with access to the motion signature, the system may boost accuracy of the eigenface-based matching algorithm by eliminating obvious true negatives using orientation information and by motion matching. For example, there is no need to consider a subject that, based upon the orientation information, is determined to be facing in the same direction as the taker's camera (since the subject is either behind the camera or with his or her back to the camera). This information is especially useful because the feature dimension from the subject device's magnetometer and gyroscope is very small and retrieving this information does not incur significant processing cost or delay.

In addition, a taker's device may determine a motion trajectory of a subject in a photograph from the analysis of consecutive frames captured by the camera of the taker's device before taking the photograph. Accordingly, the taker's device may then compare a DNC subject's motion signature with a subject's motion trajectory from the analysis of consecutive frames, or a sequence of frames, captured by the camera of the taker's device before taking a photograph. For example, if a subject is moving left to right, this action will be captured by both the orientation sensors of the subject's device and by the camera of the taker's device. As such, the taker's device can either increase or decrease the confidence of any potential facial matches. In addition, the taker's device may use motion trajectory information obtained by the camera of the taker's device to reduce the search space within a photograph. For example, the taker's device may filter out any moving subject in the photograph that is not posing, and hence not an active participant in the photograph.

To illustrate the foregoing principles, suppose a taker's device detects K different people in a photograph. M possible subjects, with M≤K, are in proximity of the taker and only N of them, with N≤M, are DNC participants. The N individuals send the taker's device (e.g., via Wi-Fi Direct) a feature vector containing the eigenfaces and the motion sensor data. The taker's device then performs the matching algorithm for each of the N individuals, by comparing two components: (1) the face representation/eigenface obtained by the taker from each individual with the eigenface of each person detected in the photograph, and (2) each individual's motion fingerprint from the motion/orientation sensor data with the motion trajectory extracted by the taker for each individual detected in the photograph from frame sequence analysis. The problem can be formulated as follows: with one taker, K detected faces ($F_1 \ldots F_K$), N DNC subjects ($S_1 \ldots S_N$), and M (N≤M) people, the taker's device computes the Euclidean distance function distance ($F_i$, $S_j$). Then, for each face ($F_i$), i=1 ... K, the algorithm returns a positive match with the smallest distance value as formalized in Equation 1 below:

$$\text{match}_i = \text{argmin}_j[\text{dist}(F_i, S_j)] \ \forall_j = 1 \ldots N, \phi \quad \text{(Equation 1)}.$$

In one embodiment, the motion information matching may be used to increase or decrease a confidence of the result of the facial features matching algorithm. However, in another embodiment the system may perform an eigenvector-based matching algorithm using the entire feature vector. For example, the feature vector itself may comprise a set of eigenvectors of the subject's face (e.g., an eigenface), as well as one or more data points (e.g., additional eigenvectors) from the motion/orientation sensor data.

As mentioned above, communications between taker's and DNC subjects' devices occur over a short-range radio interface. DNC is designed to cover scenarios where a taker and a DNC subject are less than 20 meters apart. Beyond this distance, individuals in photographs tend to become non-identifiable. In accordance with the present disclosure various short-range wireless technologies may be utilized such as, Bluetooth, Bluetooth Low Energy (BLE), Wi-Fi Direct, and so forth. However, the conventional Bluetooth radio is often considered to be power hungry and may support only seven slaves. Hence only a limited number of taker and DNC subjects can be accommodated in a distributed/peer-to-peer DNC system. BLE may be more desirable in certain situations, when it is widely supported.

Thus, in one example, Wi-Fi Direct is utilized, and in particular, the Wi-Fi Direct Service Discovery (WDSD) feature. In this mode, devices periodically broadcast their presence along with some metadata to announce their service availability. This service is, for example, used by wireless printers to announce their presence and capabilities. The WDSD feature is well suited for use in embodiments of the present disclosure because of its low-energy footprint and its connection-less nature, which eases data transport when nodes are mobile (no need to maintain connections). WDSD allows limited data payload, e.g., about 500 bytes on some of the latest smartphones, which in one embodiment is utilized to encode a DNC subject's feature vector for over-the-air transmission. It should be noted that the precise payload limit may be device-specific, and therefore may vary slightly from device to device. In one example, the feature vector, which is a combination of an eigenface and orientation sensor data, is tailored to fit this limited payload. For example, a facial feature space of 80 eigenvectors, with 4 bytes each, results in eigenface data of 320 bytes, with additional payload available for motion signature data. This also minimizes the DNC data overhead, with little extra power and battery consumption necessary over the baseline.

In one example, a common face domain is used, e.g., a dedicated face database. To train individual face models, in one embodiment a subject is requested to capture a video when he or she first begins participating in DNC, e.g., during or after the initial installation of a DNC application on the subject's device. For instance, the DNC application may assist the subject in capturing a video from which a plurality of frames are extracted uniformly and from which faces are projected onto the common face domain. For example, 20 frames may be extracted and the face in each frame projected into an eigenspace. In one embodiment, the projected features for each frame are averaged to generate a single eigenface (face model) that represents the subject, and the model is stored as a persistent file on the device. In one embodiment, the subject may be requested to engage in different facial expressions and to change the recording angle to enhance effectiveness of the model and to assist capture of the overall structure of his or her face.

To conserve battery resources, the taker's device may decline to perform a matching process for a particular subject if it can be determined that the subject is oriented in a direction that faces away from the taker's camera. For example, a rotation vector and/or orientation sensor reading may be obtained for both the taker's device and the subject's device and a difference angle determined. In a system where it is assumed that a subject perfectly facing the taker's camera is at an angle of 90 degrees and a backward angle is 270 degrees, any angle greater than 180 degrees is excluded as a possible match. This feature is particularly useful in the case of wearable devices, where the rotation vector sensor data may be assumed accurate regarding orientation of the subject's face and the orientation of a camera of the taker's device.

To further conserve resources, in one example a taker's device sets a capture flag (e.g., as a WDSD service object) which informs any listening nearby devices that the taker's device is about to capture a photograph. This allows a listening device to begin recording motion/orientation data upon receiving the notification. At the same time, the taker's device may also begin scanning the environment. For instance, the taker's device may activate a camera and begin tracing face trajectories. Typically there is between three and ten seconds from the time of the activation of the application and the time when the taker presses a button to capture a scene. After taking the photograph, the taker's device may turn off the capture flag to indicate to nearby listening devices that the recording is complete.

In turn, a listening device may then choose to send a feature vector comprising an individual's facial representation and motion signature to the taker's device. As described above, the taker's device may then compare the facial representation with faces detected in the photograph and compare the motion signature with motion trajectories detected prior to taking the photograph in order to identify a DNC subject in the photograph. It should be noted that while the time in which the taker's device and listening device must record motion information is variable, the DNC process may be configured to utilize a fixed data size or may have a maximum data size such that less than all of the recorded data is saved. For example, only the last three seconds of data may be utilized in the event that more than three second of data is recorded.

In one example, orientation and acceleration data are recorded by a subject's device in a three-dimensional world coordinate system. The taker's device then uses its own orientation sensor reading to translate the subject's acceleration values according to the taker's coordinate system. The taker's device also monitors the motion trajectory (horizontal and vertical axes) of each face in the field of view of the camera and compares the motion trajectory against the received acceleration values from the subject (projected onto the coordinate system of the taker's device).

Figure 2A:
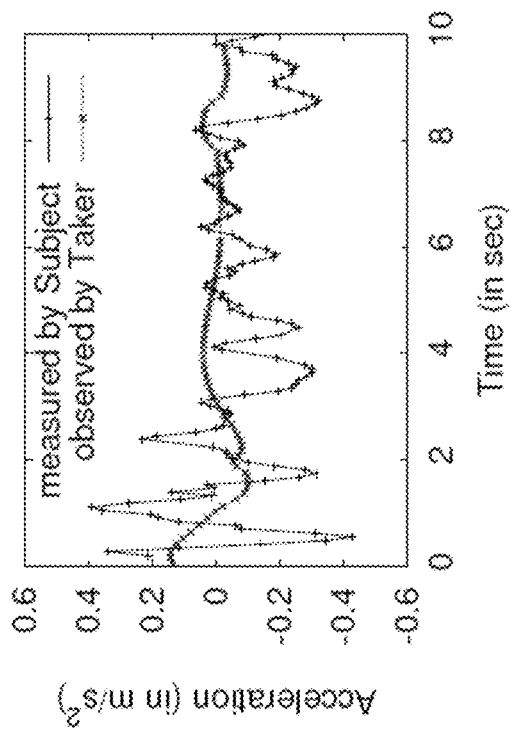
FIGS. 2A and 2B illustrate exemplary acceleration data value graphs, in accordance with the present disclosure.
Figure 2B:
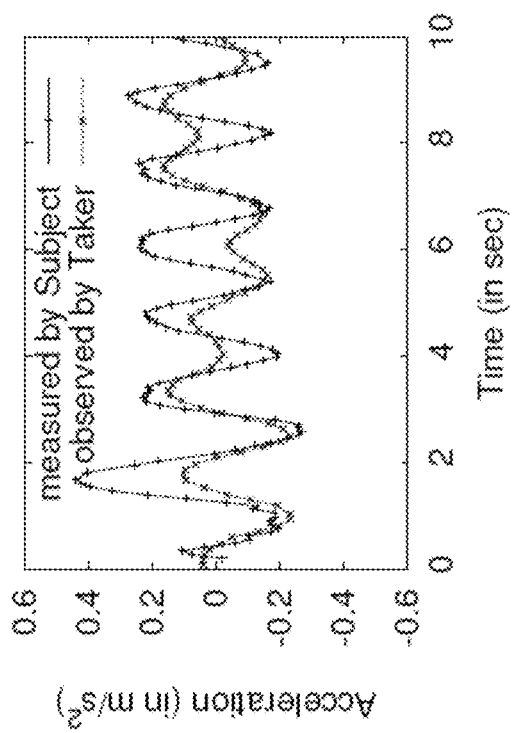

In one example, the motion trajectory of a face is maintained as a series of positions in two dimensions of the viewfinder. FIGS. 2A and 2B illustrate two scenarios where acceleration data values in one dimension (as measured by an accelerometer of a subject's device and as measured by a taker's device via motion trajectory tracking) are plotted against one another. As shown in the chart 210 of FIG. 2A, the two plots show that the acceleration data values over time are closely matched. Thus, it is likely that the subject and the face being tracked by the taker's device are the same. However, in the chart 220 in FIG. 2B, the two plots are highly divergent. Thus, the current subject is likely not the face being tracked by the taker's device. In particular, the subject appears be engaging in significant movements, while the face being observed by the taker's device is essentially stationary.

One challenge is matching the trajectory against acceleration values (recorded in m/s$^2$) as measured by the subject's accelerometer(s). In one example, properties of a detected face include the height and width in the viewfinder and the detected face's position. Correlation of the height and width of a detected face with an average adult head size (e.g., 22.5 cm in height) normalizes the position of a face. In one embodiment, for each axis, a 4-variable Kalman Filter estimates position, velocity, acceleration, and jerk along the axis. Kalman Filter is a popular tool used to estimate variables from noisy observations over time and have been widely adopted for face or object tracking in computer vision.

In one embodiment, to handle delays due to the Kalman Filter and delays in detecting moving faces in the viewfinder, a dynamic time warping (DTW) technique is employed at fixed-size time intervals (e.g., 100 ms) and using an average acceleration value for each corresponding time interval. This aggregation is also useful when attempting to distinguish whether a particular time series represents a static or moving subject. Specifically, low magnitude bins (e.g., magnitude less than 0.1 m/s$^2$) may be counted in a given time and the fraction of such bins computed over the series. If the series of acceleration values shows mostly static time bins (e.g., more than 50% static time bins), and another series shows mostly moving (e.g., less than 30% static time bins), the system can conclude that the two sets do not match. In other cases, the minimum distance by DTW is obtained and normalized by the number of time bins to use as a motion fingerprint distance metric. A second adjustment accounts for the use of approximate head size in face position normalization. While the normalization into the same units makes the two sets of acceleration values comparable, a small scaling factor is applied (e.g., less than 2) based on the peak magnitude to reduce the impact of approximation on the DTW distance. In one example, to accommodate a current data transfer limitation on Wi-Fi Direct, acceleration values are aggregated with 200 ms granularity and DTW is applied to obtain two time series. The minimum DTW distance is normalized with the number of time bins. In one example, a threshold of 0.3 is utilized to distinguish between static and in-motion subjects.

DNC is not intended to completely solve the privacy leakage problem from pervasive imaging as lighting conditions, distance between subjects and taker, and mobility are all factors that could affect the DNC filtering accuracy. However, DNC can efficiently operate in many scenarios commonly encountered during daily experience to protect the identities of individuals from uncontrolled media capture in a novel, unique, efficient, and systematic way. While ideally legislation would provide the impetus for adoption of DNC, in the absence of a binding requirement to honor DNC requests, one embodiment incentivizes users to participate in DNC as a taker (one who captures a media content). For example, DNC subjects may pay a small fee per month, per year or per transaction, where micropayments may be provided to takers who honor DNC requests as an incentive for their willingness to honor such requests.

It is also desirable that no identity reverse engineering should be possible from a feature vector voluntarily provided by a subject such that an attacker could reconstruct a recognizable face. For instance, the greater the number of eigenvectors used, the more recognizable the face. As mentioned above, some embodiments may limit the number of eigenvectors due to other considerations (e.g., 80 eigenvectors based upon the size of the WDSD data payload). For example, various faces reconstructed solely from eigenfaces using up to 90 eigenvectors were observed and it was determined that although some notable facial structures are retained, it is impossible to confidently recognize any individual.

It should be noted that the foregoing is provided for illustrative purposes only, and that the present disclosure is not limited to any specific implementation described. For example, although the foregoing describes examples in connection with a distributed/peer-to-peer arrangement, where local applications on a taker's device and on a subject's device communicate with one another directly, the present disclosure may also be embodied in various other arrangements. For instance, DNC may be implemented on one or more servers of a service provider, e.g., where a taker's device uploads photograph and motion trajectory information to a server and the server receives or stores facial imaging data and motion data from one or more subjects. Using such information, the server may then scan for identifiable subjects in the photograph. Alternative embodiments of this nature are described in greater detail below in connection with the discussion of FIG. 1. Similarly, an individual's facial features may be stored and transmitted by a device of a caregiver (e.g., parent) or by a beacon device (e.g., for a school). In this case, multiple DNC subjects may be protected by a single device. Protection may also be localized to a particular location, e.g., at the school, while additional protection off school grounds and during non-school hours may be left to the decision of a parent/guardian.

In another example, the obfuscation of a subject may comprise encrypting the portion of the media containing the image the subject with a public/private key set. Thus, the image of the subject may be captured and obfuscated with the public key, e.g., provided to the device of the taker by the device of the subject. At a later date, the image of the subject could then be unlocked with the appropriate subject-generated private key.

In another example, a voice signature of a subject may be provided in addition to the subject's facial features and/or motion signature. Accordingly, when recording a video, if the taker's device is capable of attributing a recorded sound to a particular location (and hence a particular subject) within the field of view, and is capable of voice matching the recorded voice to the voice signature, the taker's device may also remove, distort or otherwise disguise the subject's voice in addition to obscuring the subject's face. In addition, the voice matching may also be used to enhance the accuracy or confidence of the matching algorithm based upon the facial features. Numerous other variations of these examples all fall within the scope of the present disclosure.

To better understand the present disclosure, FIG. 1 illustrates in greater detail an exemplary system 100 for obfuscating images of subjects in a captured media and/or for forwarding a feature set, according to the present disclosure. As shown in FIG. 1, the system 100 connects endpoint devices 170, 171 and 172 with one or more application servers 120, 125 via a core Internet Protocol (IP) network 110, a cellular access network 140, an access network 150 and/or Internet 180.

In one embodiment, access network 150 may comprise a non-cellular access network such as a wireless local area network (WLAN) and/or an IEEE 802.11 network having a wireless access point 155, a "wired" access network, e.g., a local area network (LAN), an enterprise network, a metropolitan area network (MAN), a digital subscriber line (DSL) network, a cable network, and so forth, or a hybrid network. As such, endpoint devices 170, 171 and/or 172 may each comprise a mobile device, e.g., a cellular device and/or a non-cellular wireless device, a device for wired communication, and so forth. For example, endpoint devices 170, 171 and 172 may each comprise one of: a mobile phone, a smart phone, an email device, a computer tablet, a messaging device, a Personal Digital Assistant (PDA), a personal computer, a laptop computer, a Wi-Fi device, a tablet and so forth. In one embodiment, endpoint devices 170, 171 and 172 may include components which support peer-to-peer and/or short range communications, e.g., Bluetooth, BLE, Wi-Fi Direct, and the like. In addition, in one embodiment, one or more of endpoint devices 170, 171 and/or 172 are equipped with digital cameras, video capture devices and/or microphones in order to support various functions described herein. For example, one or more of endpoint devices 170, 171 and/or 172 may comprise a wearable device, such as a head-mounted smart camera, a smart watch, a vehicle-mounted smart camera or the like, an in-place device, such as a security camera mounted on a building, a dashboard camera on a car, and so forth.

In one embodiment, cellular access network 140 may comprise a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, cellular access network 140 may comprise an access network in accordance with any "second generation" (2G), "third generation" (3G), "fourth generation" (4G), Long Term Evolution (LTE) or any other yet to be developed future wireless/cellular network technology. While the present disclosure is not limited to any particular type of wireless access network, in the illustrative embodiment, wireless access network 140 is shown as a UMTS terrestrial radio access network (UTRAN) subsystem. Thus, an element 145 may comprise a Node B or evolved Node B (eNodeB).

In one embodiment, core IP network 110 comprises, at a minimum, network devices or components which are capable of routing and forwarding IP packets between different hosts over the network. However, in one embodiment, the components of core IP network 110 may have additional functions, e.g., for functioning as a public land mobile network (PLMN)-General Packet Radio Service (GPRS) core network, for proving Voice over Internet Protocol (VoIP), Service over Internet Protocol (SoIP), and so forth, and/or may utilize various different technologies, e.g., Asynchronous Transfer Mode (ATM), Frame Relay, multi-protocol label switching (MPLS), and so forth. Thus, it should be noted that although core IP network 110 is described as an Internet Protocol network, this does not imply that the functions are limited to IP functions, or that the functions are limited to any particular network layer.

FIG. 1 also illustrates a number of individuals at a public location, e.g., in a museum. For example, users 160 and 164 may be friends who have travelled to the museum together, while users 161, 162 and 163 may be unknown to each other and to users 160 and 164. As also illustrated in FIG. 1, user 160 may take a photograph 190 using a camera of device 170, which captures images of users 161-164 as subjects of the images.

In the present example, all or some of the users 160-164 may be DNC participants. For example, users 161 and 162 may set DNC flags on their respective devices 171 and 172 indicating that they would like images of their faces obfuscated in any captured media. User 160 may also participate in DNC as a "taker" such that his or her device 170 is configured to notify other DNC devices of an intention to capture media, to listen for any DNC flags or notifications from nearby devices and to receive feature vectors from such nearby devices. Continuing with the present example, device 170 may wirelessly send a communication indicating an intention to capture a picture or video, e.g., picture 190. For example, in one embodiment, devices 170, 171 and 172 may communicate with one another via Wi-Fi Direct or other short range communication mode. In another embodiment, devices 170, 171 and 172 may communicate with one another via one or more network infrastructure elements. For example, access network 150 may comprise a public WLAN, or Wi-Fi hotspot, where devices 170, 171 and 172 communicate via wireless access point 155. In response, devices 171 and 172 may begin recording motion/orientation sensor data. At the same time, device 170 may track movement of any detected faces and/or detected participants in a field of view of the camera. After the photograph 190 is captured, device 170 may send an indication that the capturing of the media is complete. Accordingly, devices 171 and 172 may send a feature vector with facial features and a motion signature to device 170.

Using all of the information collected, device 170 may then attempt to match users 161 and 162 to participants in the photograph 190. For example, device 170 may detect the face of user 162 in the photograph 190 using the facial features and motion signature from the received feature vector. As such, device 170 may obfuscate the face of user 162 in photograph 190 prior to recording the photograph 190 to the device and/or uploading to the Web. However, the face of user 161 may not be detected since user 161 is facing away from the camera in photograph 190. User 164 is a friend of the user 160 and was the intended subject of the photograph 190. Therefore, his or her face is not obfuscated. In addition, while user 163 may not be known to user 160, who is taking the photograph 190, he or she is not a DNC participant. Therefore, the face of user 163 is also not obfuscated in photograph 190.

Although the foregoing example describes a process that is performed by or on one or more of endpoint devices 170-172, in another embodiment the present disclosure is implemented wholly or partially by a network-based application server, e.g., one of application servers 120 or 125. For example, photograph 190 may be captured on endpoint device 170 of user 160 and uploaded to application server (AS) 125. AS 125 may receive the photograph 190 in addition to motion trajectory information of various subjects in the photograph 190 or a short video clip from a time just prior to the capturing of the photograph 190. In one example, location information of device 170 may also be provided. For example, endpoint device 170 may reveal its location to AS 125 via GPS coordinates, serving cellular base station identity (e.g., base station 145, IP address, and so forth. In one example, device 170 may transmit photograph 190, motion trajectory information of subjects in the photograph 190 and location information of device 170 to AS 125 via any one or more of core IP network 110, cellular access network 140, access network 150 and/or Internet 180.

In addition, AS 125 may store in DB 126 facial features (eigenfaces) of one or more users, including users 161 and 162. AS 125 may also receive motion signature information as well as current location information for devices 171 and 172 of users 161 and 162 respectively, e.g., via any one or more of core IP network 110, cellular access network 140, access network 150 and/or Internet 180. Thereafter, AS 125 may identify DNC subjects in photograph 190 using the processes described above. Thus, AS 125 may similarly detect the face of user 162 in photograph 190 and use one or more obscuring techniques to render the face of user 162 unrecognizable in the photograph 190. AS 125 may return photograph 190 in a modified form to device 170, store modified photograph 190 in the DB 126 and/or forward modified photograph 190 to another storage location or another entity (e.g., a server of a social media provider, a cloud storage provider and the like). To reduce the search space, in one embodiment AS 125 may only consider users/devices who are nearby to the capturing device and which have a DNC flag activated. In another embodiment, the taker's device (e.g., device 170) sends a notification of an intention to capture media, where the notification has a unique identifier (ID). Device 170 may also provide the unique ID to AS 125. A listening device nearby may receive the unique ID over-the-air and provide the unique ID to AS 125. Consequently, AS 125 may only consider nearby DNC participants based upon the unique ID. The present disclosure may also be implemented by AS 120 and DB 121, where AS 120 is operated by a telecommunications network service provider that may own and/or operate core IP network 110 and/or cellular access network 140.

In one embodiment, the present disclosure may supplement facial recognition techniques by identifying a body shape of a participant and/or by identifying articles of clothing, e.g., where there is access to prior photographs from the same day and where a subject may be wearing the same distinctive outfit. In addition, the above examples are described in connection with sharing of a photograph 190. However, the present disclosure is not limited to the context of photographs, but rather encompasses various forms of media content, e.g., video recordings (with or without accompanying audio). Thus, in one embodiment, identification of a DNC subject may be enhanced by using voice matching techniques in addition to facial feature matching and motion signature matching. For example, users 161 and 162 may further provide voice feature vectors which provide enough detail to be matched to voices in an audio portion of a video, but which are not rich enough to personally identify the subjects.

Figure 3:
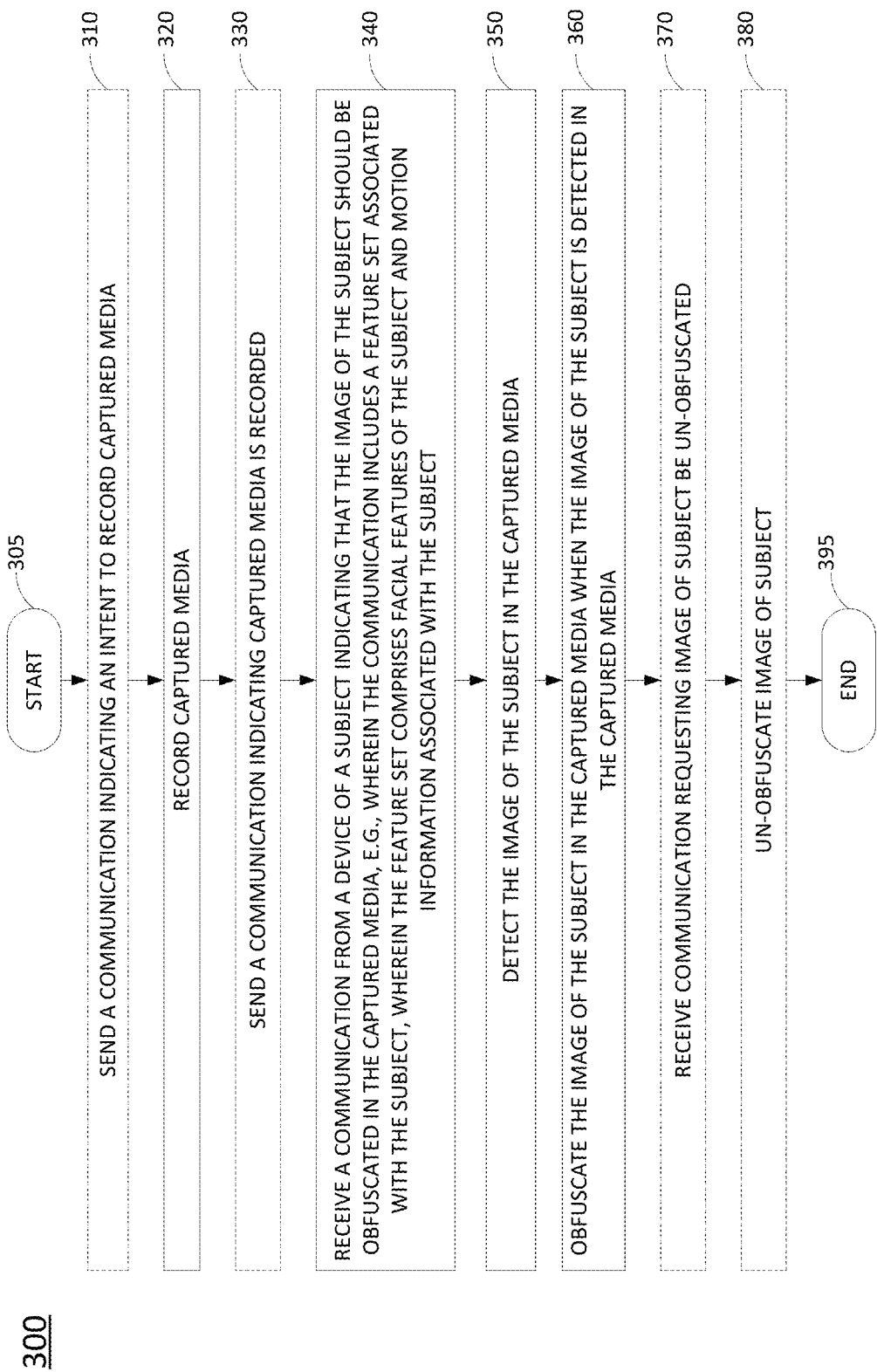
FIG. 3 illustrates a flowchart of a method for obfuscating an image of a subject in a captured media, in accordance with the present disclosure.

FIG. 3 illustrates a flowchart of a method 300 for obfuscating an image of a subject in a captured media. In one embodiment, steps, functions and/or operations of the method 300 may be performed by an endpoint device, such as endpoint device 170 in FIG. 1. In one embodiment, the steps, functions, or operations of method 300 may be performed by a computing device or system 600, and/or processor 602 as described in connection with FIG. 6 below. The method begins in step 305 and proceeds to optional step 310.

At optional step 310, the method 300 sends a communication/signal indicating an intent to record captured media. For example, a user (e.g., a taker) of a mobile endpoint device may be a participant in a Do-Not-Capture (DNC) system, where the user's mobile endpoint device may be configured to transmit a DNC intent-to-record communication to nearby listening device when the user activates a particular key, access a camera function, and so forth. In one example, the communication may be broadcast using Wi-Fi Direct, or other short-range wireless communication mode.

At step 320, the method 300 records the captured media. For example, a device may record a photograph or video (with or without audio) using a camera and/or microphone of the device, or connected to the device. Notably, the media content may include the images of one or more subjects, any of which may desire that his or her image (face) be obfuscated in the captured media. For example, an individual may take a photograph or video of a friend, but may inevitably capture the facial images of various strangers, some or all of whom would prefer to not appear in the media. In one embodiment, prior to or at the same time as the method 300 records the captured media at step 320, the method 300 may further track and gather data regarding motion trajectories of faces/subjects detected by a camera. For example, the method 300 may detect and track movements of faces, or all or a portion of a body, in a field of view of the camera for a short time (e.g., approximately three to ten seconds) prior to recording a photograph or video.

At optional step 330, the method 300 sends a communication indicating that the captured media is finished being recorded. For example, the method may stop transmitting an intent-to-capture signal such that nearby listening devices are made aware that the recording of the captured media is complete. In another embodiment, the method 300 may send a new signal that simply indicates that the media capture is complete.

At step 340 the method 300 receives a communication from a mobile endpoint device of a subject indicating that the image of the subject should be obfuscated in the captured media. For example, a subject participating in a DNC system may have a mobile endpoint device that is configured to listen for DNC communications indicating an intention to record captured media. In response to detecting such a communication, the listening device may then record orientation/motion information to be provided after the media is captured by the taker's mobile endpoint device. Accordingly, in one embodiment the communication may include a feature set, or feature vector associated with the subject that includes a representation of a face of the subject and/or motion information, or a motion signature, associated with the subject. For example, the motion information may include acceleration vectors and rotation vectors recorded by the mobile endpoint device of the subject in response to receiving the communication/notification sent at step 310. In one embodiment, the communication is received wirelessly, e.g., using Wi-Fi Direct or other near-field communication technique. In one embodiment, the communication may further include a public key of a public/private key pair generated by the device of the subject or otherwise under the control of the subject.

At step 350, the method 300 detects the image of the subject in the captured media. For example, the method 300 may perform a matching process as described above to determine a match, or lack of a match to a facial image detected in the captured media. In one embodiment, the method 300 detects all faces in the image using a facial detection algorithm and then attempts to match the facial features of the subject received at step 340 with facial features of each of the detected faces in the image. To enhance the accuracy of the matching, the method 300 may further match the motion information of the subject with trajectories of the facial images detected in the media. For example, as mentioned above, the method 300 may record motion trajectories for faces/subjects detected in the field of view of a camera. Accordingly, if the motion information does not match a motion trajectory, this may assist the method 300 in confirming that the subject and a particular facial image are not a match.

It should be noted that in one embodiment, the method 300 may not attempt to match the subject to a facial image in the media if the orientation information received from the device of the subject indicates that the subject was facing away from the camera at the time the captured media was recorded. However, for illustrative purposes it is assumed that this is not the case. In other words, it is assumed that the subject matches one of the images in the captured media (e.g., by determining the Euclidean distance between a projected face from the captured media and the facial features of the subject to determine whether a match score exceeds a threshold confidence value, enhanced by matching a motion trajectory with the motion information received from the subject's device).

At step 360, the method 300 obfuscates the image of the subject in the captured media. For example, the method 300 may blur the image of the face of the subject to protect the subject's identity before the captured media is saved or pushed to the Web. Alternatively or in addition, method 300 may use image in-painting, seam carving, pixel inference and other techniques to obscure the image of the subject's face (or a larger portion of a subject's body). In one example, the obfuscation incorporates an encryption of the image of the subject using a public key received at step 340.

At optional step 370, the method 300 may receive a further communication requesting or authorizing that the image of the subject be un-obfuscated. For example, the subject may later decide that he or she would like the image of the subject to be un-obfuscated, for various reasons. For instance, if the captured media is of a newsworthy event, the subject may change his or her mind as to whether to make public his or her presence at the event. Thus, in one example, if the image of the subject is obfuscated using a public encryption key, the communication received at step 370 may include a private key which will enable the obfuscation of the subject's image to be undone.

At optional step 380, the method 300 un-obfuscates the image of the subject in response to the communication received at step 370. For instance, the image may be un-obfuscated using a private key received at step 370.

Following step 360 or step 380, the method 300 proceeds to step 395 where the method ends. Notably, steps 340-380 may be repeated with respect to a plurality of subjects from which a feature set, or feature vector is received.

Figure 4:
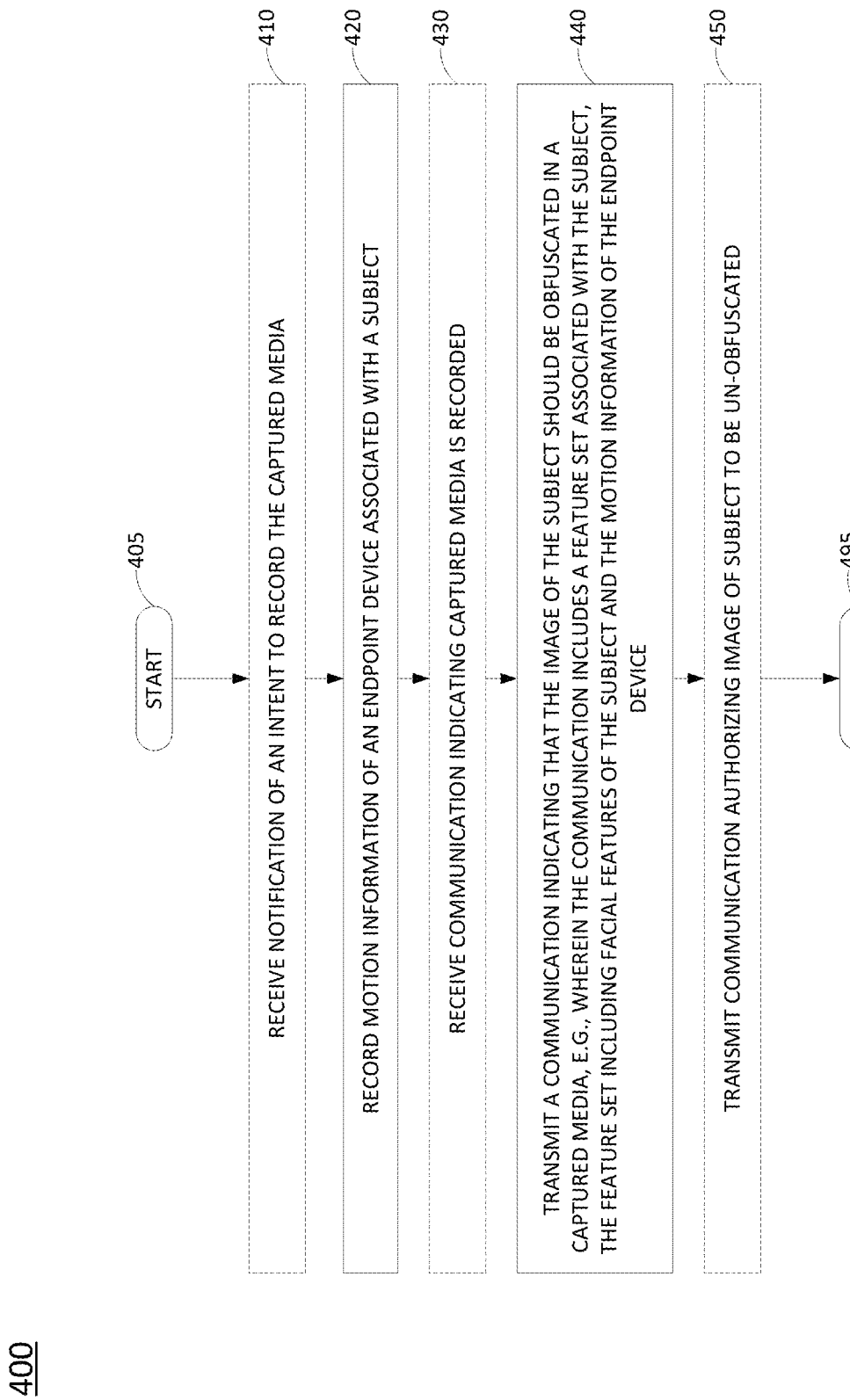
FIG. 4 illustrates a flowchart of another method for communicating a feature set, in accordance with the present disclosure.

FIG. 4 illustrates a flowchart of another method 400 for communicating a feature set. In one embodiment, steps, functions and/or operations of the method 400 may be performed by a mobile endpoint device, such as mobile endpoint device 171 or 172 in FIG. 1. In one embodiment, the steps, functions, or operations of method 400 may be performed by a computing device or system 600, and/or processor 602 as described in connection with FIG. 6 below. The method begins in step 405 and proceeds to optional step 410.

At optional step 410, the method 400 receives a notification of an intention to record a captured media. For example, a user (subject) may be a participant in a do-not-capture (DNC) system, where the subject's mobile endpoint device may be configured to listen for communications from other nearby mobile endpoint devices indicating an intention to record a captured media. In one example, the communication may be broadcast using Wi-Fi Direct, or other short-range wireless communication mode. Thus, the method 400 may listen for this communication/signal and receive the notification at step 410 when the notification is sent by the nearby mobile endpoint device.

At step 420, the method 400 records motion information. For example, the method may record a time series of acceleration vectors and rotation vectors of a mobile endpoint device of the subject in response to receiving the communication sent at step 410.

At optional step 430, the method 400 receives a communication indicating that the captured media has been recorded. For example, the mobile endpoint device of the user recording the captured media may stop transmitting an intent-to-capture signal such that nearby listening devices are made aware that the recording of the captured media is complete. Thus, the method 400 may listen for and receive this communication at step 430. In one embodiment, the method 400 stops recording the motion information when the communication is received at step 430 indicating that the captured media has been recorded.

At step 440, the method 400 transmits a communication indicating that the image of the subject should be obfuscated in the captured media. For example, the method may assemble and send a communication that includes a feature set, or feature vector associated with the subject. In one embodiment, the feature set may include a representation of a face of the subject and all or a portion the motion information recorded at step 420 (a motion signature). In one embodiment, the communication may further include a public key for use in obfuscating the image of the subject. In one embodiment, the communication is sent wirelessly, e.g., using short-range communication techniques such as Bluetooth, ZigBee, Wi-Fi, and so forth.

At optional step 450, the method 400 may transmit a communication requesting or granting permission to un-obfuscate the image of the subject. For example, if the image of the subject is obfuscated using a public encryption key, the communication sent at step 450 may include a private key which will enable the obfuscation of the subject's image to be undone.

Following step 440 or 450, the method 400 proceeds to step 495 where the method ends.

Figure 5:
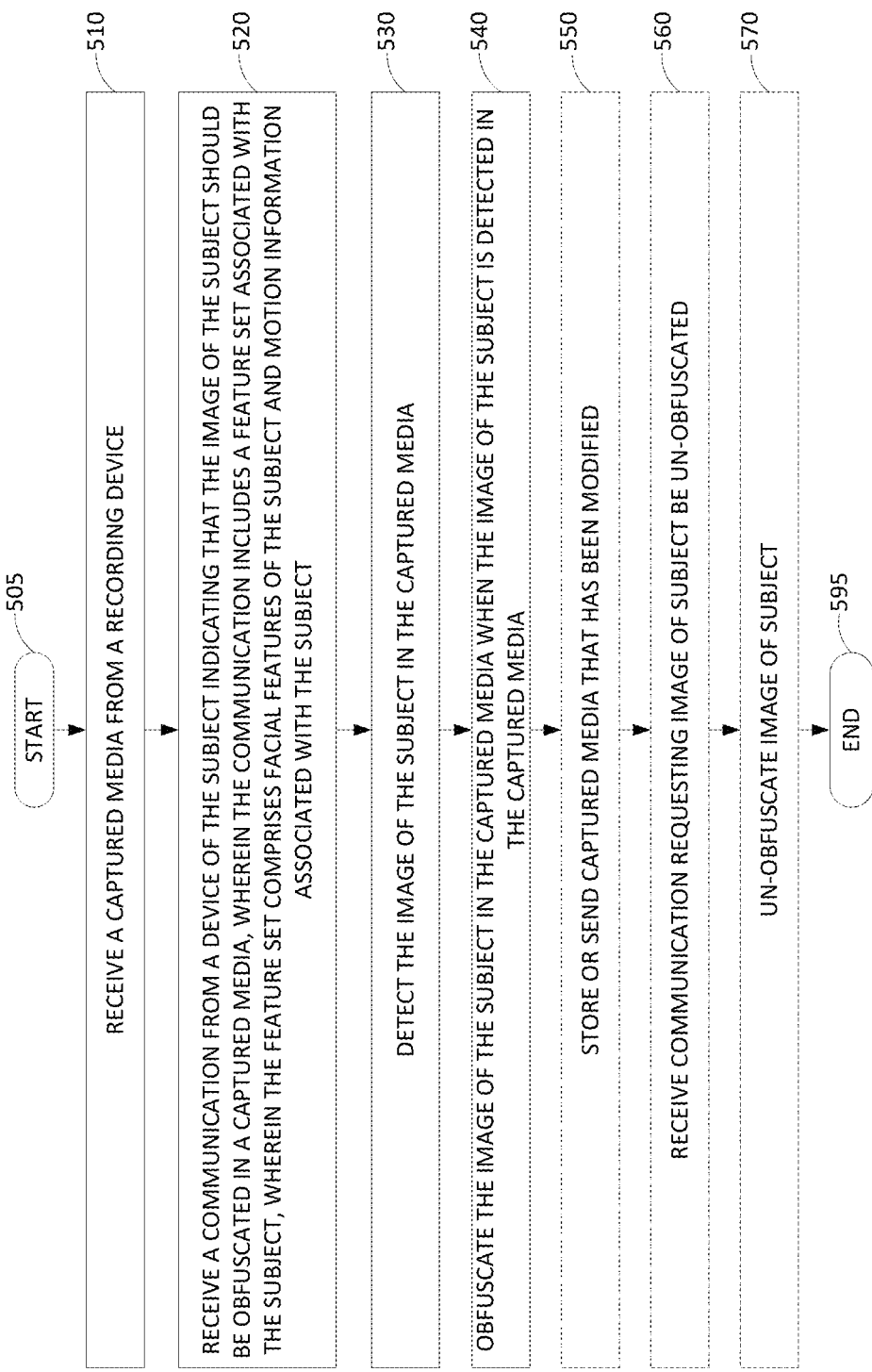
FIG. 5 illustrates a flowchart of still another method for obfuscating an image of a subject in a captured media, in accordance with the present disclosure.

FIG. 5 illustrates a flowchart of another method 500 for obfuscating an image of a subject in a captured media. In one embodiment, steps, functions and/or operations of the method 500 may be performed by a network-based device, e.g., application server 120 or 125 of a service provider in FIG. 1. In one embodiment, the steps, functions, or operations of method 500 may be performed by a computing device or system 600, and/or processor 602 as described in connection with FIG. 6 below. The method begins in step 505 and proceeds to step 510.

At step 510, the method 500 receives a captured media from a recording device, e.g., wearable smart device, a smartphone with integrated camera, a mobile device with an integrated camera, or coupled (wirelessly or otherwise) to an associated camera. In one example, the captured media is received via one or more communication networks, such as cellular access network 140, core IP network 110, internet 180, and so forth, as illustrated in FIG. 1. For example, the method 500 may receive the captured media from a mobile endpoint device of a participant in a Do-Not-Capture (DNC) system for purposes of sanitizing the images contained in the captured media.

In one embodiment, at step 510 the method 500 further receives location information of the mobile endpoint device and motion trajectory information pertaining to one or more facial images/subjects detected in the captured media. For example, the recording device (taker device) may detect and track movements of faces, or all or a portion of a body, in a field of view of the camera for a short time (e.g., approximately three to ten seconds) prior to taking a photograph, or throughout the duration of a video (in the case where the captured media comprises a video). Thus, the method 500 may receive from the recording device, motion trajectories for the one or more subjects in the captured media. However, in another embodiment the method 500 may receive a video clip from a short period of time prior to the capturing of the photograph (or may simply receive the video if the captured media comprises a video). In this case, the method 500 may calculate motion trajectories in the same or similar manner as described above in connection with step 320 of the method 300.

At step 520, the method 500 receives a communication from a mobile endpoint device of a subject indicating that the image of the subject should be obfuscated in the captured media. For example, a subject participating in a DNC system may have a mobile device that is configured to listen for DNC communications indicating an intention to record captured media. In response to detecting such a communication, the listening device may then record orientation/motion information to be provided after the media is captured by the taker's device. Accordingly, in one embodiment the communication includes a feature set, or feature vector associated with the subject that includes a representation of a face of the subject and motion information, or a motion signature, associated with the subject. For example, the motion information may include acceleration vectors and/or rotation vectors as calculated and/or recorded by the device of the subject in response to receiving from a nearby device a notification of an intention to record the captured media. In addition, in one embodiment the communication received at step 520 may also include location information of the subject's mobile endpoint device, such that the method 500 may correlate the captured media with potential subjects in the captured media. In one example, the communication is received via one or more communication networks, such as cellular access network 140, core IP network 110, Internet 180, and so forth, as illustrated in FIG. 1.

At step 530, the method 500 detects the image of the subject in the captured media. For example, the method 500 may perform a matching process as described above to determine a match, or lack of a match to a facial image detected in the captured media. In one embodiment, the method 500 detects all faces in the image using a facial detection algorithm and then attempts to match the facial features of the subject received at step 520 with facial features of each of the detected faces in the image. To enhance the accuracy of the matching, the method 500 may further match the motion information of the subject with trajectories of the facial images detected in the media. Notably, step 530 may involve the same or similar functions/operations described in connection with step 350 of the method 300 above.

In addition, in one embodiment the method 500 may match the location in which the captured media has been recorded with a location of the mobile endpoint device of the subject. In other words, in one example the method 500 will only scan the captured media to determine if there is a match to the subject if the subject is nearby to device which recorded and uploaded the captured media (i.e., within a threshold distance, such as less than 20 meters, less than 50 meters, and so forth).

At step 540, the method 500 obfuscates the image of the subject in the captured media. For example, the method 500 may blur the image of the face of the subject to protect the subject's identity before the captured media is saved or pushed to the Web. Alternatively or in addition, method 500 may use image in-painting, seam carving, pixel inference and other techniques to obscure the image of the subject's face (or a larger portion of a subject's body). Notably, step 540 may involve the same or similar functions/operations described in connection with step 350 of the method 300 above. Following step 540, the method may proceed to step 595 where the method ends, or may proceed to optional step 550.

At optional step 550, the method 500 may store or send the captured media that has been modified at step 540. For example, in one embodiment the method 500 may be executed at a server of a social network or cloud storage provider which may host the captured media on behalf of the uploading user. However, in another embodiment step 550 may comprise sending the captured media that has been modified back to the uploading user, e.g., in an email, multimedia messaging service (MIMS) message, or the like.

At optional step 560, the method 500 may receive a further communication requesting or authorizing that the image of the subject be un-obfuscated. Thus, in one example, if the image of the subject is obfuscated using a public encryption key, the communication received at step 560 may include a private key which will enable the obfuscation of the subject's image to be undone.

At optional step 570, the method 500 un-obfuscates the image of the subject in response to the communication received at step 560. For instance, the image may be un-obfuscated using a private key received at step 560.

Following step 540, step 550 or step 570, the method 500 proceeds to step 595 where the method ends.

It should be noted that although not specifically specified, one or more steps, functions or operations of the respective methods 300, 400 and/or 500 may include a storing, displaying and/or outputting step as required for a particular application. In other words, any data, records, fields, and/or intermediate results discussed in the respective methods can be stored, displayed and/or outputted to another device as required for a particular application. Furthermore, steps or blocks in FIGS. 3-5 that recite a determining operation or involve a decision do not necessarily require that both branches of the determining operation be practiced. In other words, one of the branches of the determining operation can be deemed as an optional step.

Figure 6:
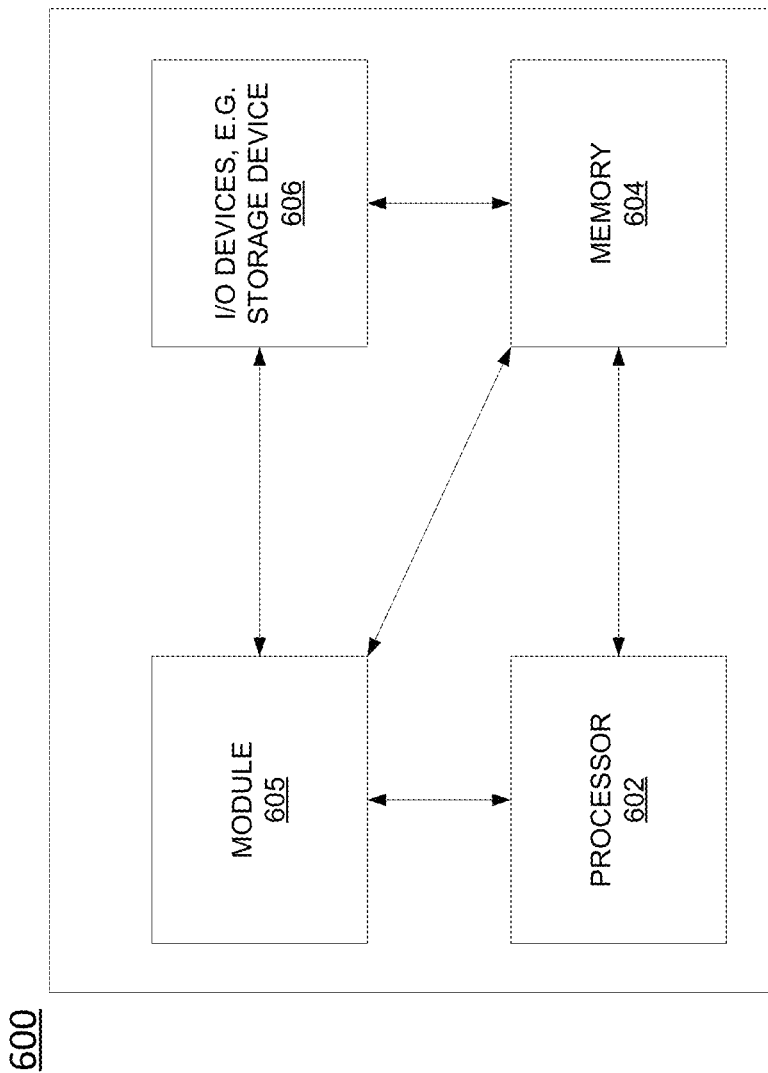
FIG. 6 illustrates a high-level block diagram of a general-purpose computer suitable for use in performing the functions described herein.

FIG. 6 depicts a high-level block diagram of a general-purpose computer or system suitable for use in performing the functions described herein. For example, any one or more components or devices illustrated in FIG. 1 or described in connection with the methods 300, 400 or 500 may be implemented as the system 600. As depicted in FIG. 6, the system 600 comprises a hardware processor element 602 (e.g., a microprocessor, a central processing unit (CPU) and the like), a memory 604, (e.g., random access memory (RAM), read only memory (ROM), a disk drive, an optical drive, a magnetic drive, and/or a Universal Serial Bus (USB) drive), a module 605 for obfuscating an image of a subject in a captured media and/or for communicating a feature set, and various input/output devices 606, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 605 for obfuscating an image of a subject in a captured media and/or for communicating a feature set (e.g., a software program comprising computer-executable instructions) can be loaded into memory 604 and executed by hardware processor element 602 to implement the steps, functions or operations as discussed above in connection with the exemplary methods 300-500. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for obfuscating an image of a subject in a captured media and/or for communicating a feature set (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method, comprising:
broadcasting, by a mobile device, a capture flag indicating an intent to capture a digital image prior to capturing the digital image to a nearby different mobile device;
requesting, by the mobile device, the nearby different mobile device to record motion information of a subject of the digital image;
receiving, by the mobile device, a do not capture flag, comprising the motion information, from the nearby different mobile device, the do not capture flag requesting an obfuscation in the digital image;
capturing, by the mobile device, the digital image; and
in response to the do not capture flag, obfuscating, by the mobile device, at least a portion of the digital image.

2. The method of claim 1, further comprising receiving an information specifying the portion of the digital image.

3. The method of claim 1, further comprising blurring the portion of the digital image.

4. The method of claim 1, further comprising blocking the portion of the digital image.

5. The method of claim 1, further comprising altering at least one pixel that corresponds to the portion of the digital image.

6. The method of claim 1, further comprising blackening at least one pixel that corresponds to the portion of the digital image.

7. The method of claim 1, further comprising removing the portion of the digital image.

8. A system, comprising:
a hardware processor; and
a memory device, the memory device storing instructions, the instructions when executed causing the hardware processor to perform operations, the operations comprising:
broadcasting a capture flag indicating an intent to capture a digital image prior to capturing the digital image to a nearby mobile device;
requesting the nearby mobile device to record motion information of a subject of the digital image;
receiving a do not capture flag, comprising the motion information, from the nearby mobile device, the do not capture flag requesting an obfuscation of a face in the digital image;
capturing the digital image; and
in response to the do not capture flag from the nearby mobile device, obfuscating the face in the digital image.

9. The system of claim 8, wherein the operations further comprise receiving a facial feature that corresponds to the face in the digital image.

10. The system of claim 9, wherein the operations further comprise matching the facial feature to the digital image.

11. The system of claim 8, wherein the operations further comprise receiving a motion associated with the face in the digital image.

12. The system of claim 11, wherein the operations further comprise matching the motion to the digital image.

13. The system of claim 8, wherein the operations further comprise detecting the face in the digital image.

14. The system of claim 8, wherein the operations further comprise associating the nearby mobile device to the face in the digital image.

15. A memory device storing instructions that when executed cause a hardware processor to perform operations, the operations comprising:
broadcasting a capture flag indicating an intent to capture a digital image prior to capturing the digital image to a nearby mobile device;
requesting the nearby mobile device to record motion information of a subject of the digital image;
receiving a do not capture flag, comprising the motion information, from the nearby mobile device, the do not capture flag requesting an obfuscation of a face in the digital image;
capturing the digital image; and
in response to the do not capture flag from the nearby mobile device, obfuscating the face in the digital image.

16. The memory device of claim 15, wherein the operations further comprise receiving a facial feature that corresponds to the face in the digital image.

17. The memory device of claim 16, wherein the operations further comprise matching the facial feature to the digital image.

18. The memory device of claim 15, wherein the operations further comprise receiving a motion associated with the face in the digital image.

19. The memory device of claim 18, wherein the operations further comprise matching the motion to the digital image.

20. The memory device of claim 15, wherein the operations further comprise detecting the face in the digital image.

* * * * *